Feb. 6, 1940.  W. T. MEAD  2,189,149
AUTOMOBILE THEFT DETECTOR
Filed Sept. 14, 1938
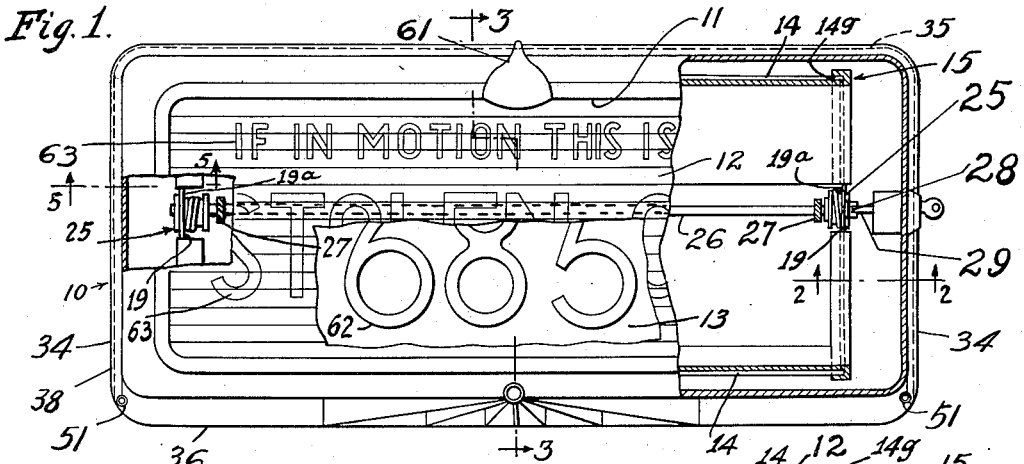
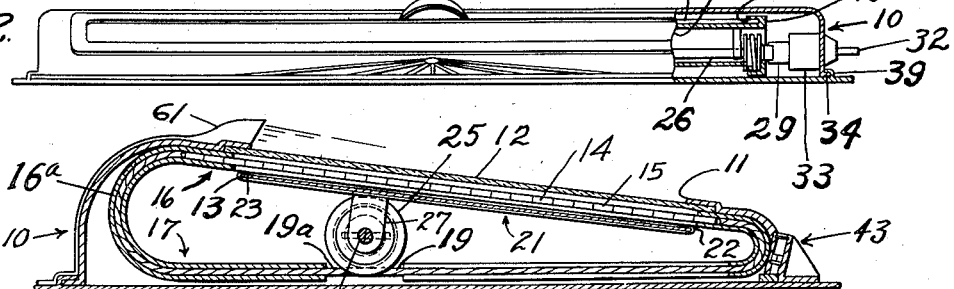
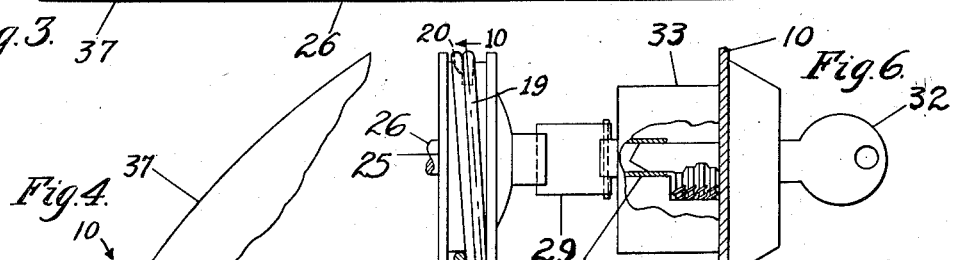
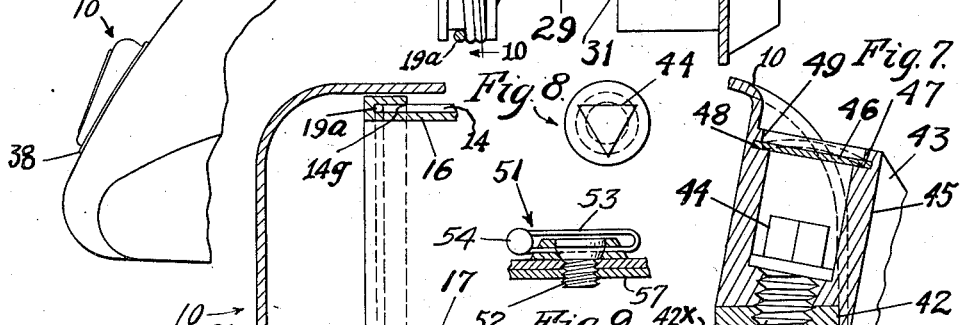
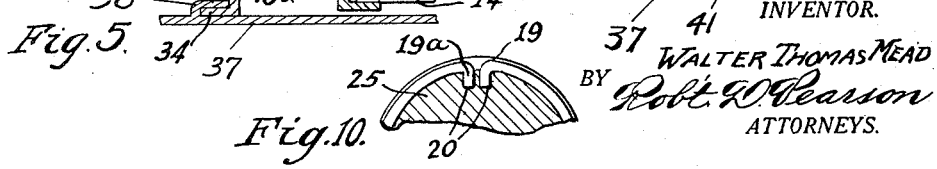
INVENTOR.
WALTER THOMAS MEAD
BY Robt. W. Pearson
ATTORNEYS.

Patented Feb. 6, 1940

2,189,149

UNITED STATES PATENT OFFICE 2,189,149

AUTOMOBILE THEFT DETECTOR

Walter Thomas Mead, Los Angeles, Calif.

Application September 14, 1938, Serial No. 229,910

4 Claims. (Cl. 40—2.2)

This invention relates to an automobile theft detector and to a means for sealing the same so that it cannot be removed, without detection, in an unauthorized manner from a motor vehicle.

An object of the invention is to provide for sealing an automobile license plate in its attached position on the vehicle so that it cannot be removed by unauthorized persons without detection.

The invention provides a means which will enable the general public to detect immediately the fact that the automobile is being driven by a person who is not authorized to do so.

More specifically stated, one object of the invention is to provide a casing for containing the State license plate, said casing having a window through which the license number on said plate is normally exposed to view; in combination with a shutter operable by a key possessed by the owner to be thereby moved from a position wherein it completely obstructs the view of said number through said window. This arrangement enables the owner of a car equipped with the invention to move the shutter across said window when parking the car, thus concealing the rear (preferably) license number plate and thereby serving notice to all observers that, if the car is in motion, it is being driven illegally.

Other objects, advantages and features of invention will hereinafter appear.

Referring to the accompanying drawing, which illustrates what is at present deemed to be a preferred embodiment of the invention, Fig. 1 is a plan view of the device, part of the casing being broken away in order to show underlying structure more clearly.

Fig. 2 is a side elevation of the device, a part of the casing being broken away in this view also, on line 2—2 of Fig. 1 to show underlying construction.

Fig. 3 is a cross-section on line 3—3 of Fig. 1.

Fig. 4 is a fragmental side elevation wherein is shown the rear portion of the self-propelled motor vehicle, illustrating the attachment of the device thereto.

Fig. 5 is a fragmental cross-section taken on line 5—5 of Fig. 1, the scale being larger than on the latter view.

Fig. 6 is an enlarged reproduction, partly in vertical mid-section and partly in side elevation, of parts shown in the right hand portion of Fig. 2, illustrating the key operable means for moving the shutter for the license plate to and from the position wherein it covers the license number.

Fig. 7 is an enlarged, fragmental reproduction of parts shown in the right hand portion of Fig. 3. This view illustrates the means for locking the device in place on the vehicle and thereafter sealing the locking means.

Fig. 8 is a top plan view of the locking bolt shown in Fig. 7.

Fig. 9 is an enlarged sectional detail of one of the sealing devices shown in the lower corner portions of Fig. 1.

Fig. 10 is a fragmental sectional detail taken on line 10—10 of Fig. 6.

Referring in detail to the drawing, the casing 10 is furnished with a window opening 11 which is covered by a transparent plate 12, preferably glass. Within said casing the license plate 13 is supported a little below said window opening in a position to be concealed, at times, by the jointed shutter 14 of the roll top desk type, said shutter being furnished with a track 15 or runway to guide and support each of its end portions, said end portions occupying channels afforded by said tracks. Each of said tracks is of substantially the same shape as the other. The mid-length portion 16a of each of these tracks is of an arcuate shape and each track has a substantially straight upper run 16 and a similar straight lower run 17, these track runs converging somewhat toward each other as they approach their ends. Each of said end tracks is of a channel iron shape, the open side of the channel of each track being directly toward the track at the opposite side of the casing. This construction provides a runway for each end portion of the jointed metallic shutter 14 and also guides the flexible connections 19 whereby said shutter is moved to and from a position wherein it conceals the license plate 13.

The mounting means for said license plate comprises a base plate 21 having along its lower edge an upwardly directed rebent flange 22 which forms a groove to receive the lower edge of the license plate, there being a like flange 23 along the upper edge of said base plate to receive the opposite edge portion of said license plate. By this means the license plate is supported in an adjacent underlying position in relation to the window 11.

Returning to the construction and operation of the jointed shutter 14, the shutter operating connections 19 and 19a at each end of the casing are directed upwardly over and attached to the broadly grooved pulleys 25, and each of said operating connections is windable around its pulley and is attached thereto in sockets like the socket 20 shown in Fig. 6, in any desired well known manner. Said pulleys are secured to opposite ends of an operating shaft 26, said shaft being located somewhat nearer the widest end of the double track. Each end portion of said shaft is supported by a bearing plate 27, said bearing plates affording a means for supporting the lower run 17 of the tracks, reference being made to said track as viewed in Fig. 3. It is to be understood that the construction of the device is symmetrical in relation to the midlength of the casing and that in Fig. 1 the parts that are disclosed in the right hand, sectioned part of the view are duplicated in the left hand portion thereof.

As a means for rotating said shaft for the purpose of turning the pulleys fastened thereto and thereby moving the jointed shutter to and from its operative position, said shaft is provided with a diametrical kerf or slot 28 across one end portion, and an operating tongue 29 is provided to engage said slot and rotate said shaft. Said tongue 29 is swingably secured to the end of a lock barrel 31 which is rotated by a tumbler-controlled key 32. Said lock barrel has its bearing in a lock case 33 which is fitted in an aperture provided for it in the end wall of the casing, and is secured in this position by any suitable means.

It has been found by experiment that the double acting flexible connections afford a superior means for moving the jointed shutter along its tracks to and from the position wherein it obstructs the view of the license number through the window opening of the casing. The broadly grooved pulley 25 can be rotated through two revolutions without the coils of the connections 19 and 19a overlying each other.

The jointed shutter 14 should have inscribed upon it an inscription indicating that, if the car is being driven while the shutter is in its operative or down position concealing the license plate number, the car has been stolen. In the drawing a double inscription is shown. Said inscription reading "If in motion, this is a stolen car."

The casing 10 is furnished with basal end flanges 34 with a top flange 35 and a lower flange 36. To the rear portion of the metal body 37 of the car is welded a mounting flange 38 which is shaped as an inverted rectangular U. Said flange has a doubled over portion 39. The upstanding part of the flange 38 is welded or otherwise permanently secured to the car body. By this means a narrow space is provided under the body portion of the flange which is adapted to receive the aforesaid end flanges 34 of the casing.

As a means for locking the casing in place with its end flanges in position as just indicated, a screw threaded locking bolt 41 is furnished, said bolt cooperating with a locking bar 42. Said bar has in it a suitable recess to receive the end of said bolt. As a means for affording a screw threaded anchorage for said locking bolt, the mid-length portion of the lower part of the casing is furnished with a lug 43 having a screw threaded bore therethrough. Said locking bolt 41 is shown furnished with a triangular head 44, in order that it may only be operated by a tool having a socket shaped to fit upon it. Said lug 43 is shown in Fig. 7 as being integral with the casing 10. The locking bar 42 will be attached to the automobile wall 37 in any suitable manner, desirably by welding 42x.

Said lug 43 is furnished with a cylindrical upward extension 45 to receive the operating tool just mentioned. After the tool has been used to force the bolt 41 down a sealing disk 46 is inserted in the upper portion of said bore. Said sealing disk rests upon an annular shoulder 47, and fits within a groove 48 provided for it. Above said groove 48 the lug is furnished with an annular shoulder 49 which is somewhat greater in diameter than the shoulder 47. As indicated by dotted lines in Fig. 7 the disk 46 is originally of a somewhat concavo-convex shape and when it is being put in place the concave face thereof is directed downwardly, the diameter of the disk at this time being small enough to permit the insertion thereof within the outer shoulder 49. When thus inserted and while resting upon the lower shoulder 47, percussion is applied to its convex face through a suitable punch by a hammer, and the disk is thus caused to expand diametrically to the position shown in full lines in Fig. 7. As a means of imprinting upon said disk a seal, for example that of the State issuing the license plate, the punch mentioned may have such a seal embossed upon it so that it will be impressed upon the somewhat soft metal of which the disk 46 is composed.

If preferred, the State seal or other seal used may be impressed upon the disk 46 before it is acted upon by the punch as has been stated. A deeply impressed seal will not be seriously defaced by the action of the smooth punch thereupon.

As an additional precaution against unauthorized persons removing the device from the vehicle, a pair of seals 51 are shown attached to the lower corner portions of the casing 10. Said pair of seals are used to seal in place additional attaching screws 52 and seals shown for this purpose may be rebent wire elements 53, a conventional lead sealing body 54 being used for each seal.

A reflector 61 is shown attached to the upper part of the front of the casing 10 to direct the rays of an electric lamp downwardly upon the license number 62, or upon the inscription 63. In Fig. 1 the shutter 14, parts of which are broken away, is shown in the down position, and a part of the license plate 13 is disclosed together with a portion of the license number 62 carried by said plate.

I claim:

1. A device of the kind described comprising a casing having a window opening through one of its walls, a license number plate mounted within said casing in such a position that the license number upon said plate is normally visible through said opening, channel shaped tracks arranged on opposite sides of said opening, a jointed shutter of the roll top desk type having edge portions movable along said tracks to and from a position wherein it obstructs visibility of said license plate number through said opening, and key operable means to move said shutter along said tracks, said opposite edge portions of said shutter traveling in the channels of said tracks.

2. A device of the kind described comprising a casing having a window opening through one of its walls, a license number plate mounted within said casing in such a position that the license number upon said plate is normally visible through said opening, tracks arranged on opposite sides of said opening, a jointed shutter movable along said tracks to and from a position wherein it obstructs visibility of said license plate number through said opening, said tracks having upper and lower runs which are joined by arcuate portions, said jointed shutter being arranged to travel over said arcuate portions, flexible connections to operate said jointed shutter, pulleys upon which said connections are arranged to wind and unwind, and key operable means to rotate said pulleys and thereby move said shutter in opposite directions.

3. The subject matter of claim 2 and, said key operable means including a shaft to which said pulleys are fixed, and rotary means operable by the key and connectible with an end portion of said shaft.

4. The subject matter of claim 2 and, said key operable means including a shaft having a diametrical kerf in an end portion thereof and rotatable means operable by a key and having a tongue engaging said kerf.

WALTER THOMAS MEAD.